(12) United States Patent
Lee-Smith et al.

(10) Patent No.: US 7,503,997 B2
(45) Date of Patent: Mar. 17, 2009

(54) TEMPERATURE SENSING IN CENTRIFUGAL EVAPORATORS

(75) Inventors: Roger Lee-Smith, Hadleigh (GB); Richard Smith, Ipswich (GB); Duncan Guthrie, Nr. Sudbury (GB)

(73) Assignee: Genevac Ltd., Suffolk (GB)

( * ) Notice: Subject to any disclaimer, the term of this patent is extended or adjusted under 35 U.S.C. 154(b) by 749 days.

(21) Appl. No.: 10/522,448

(22) PCT Filed: Oct. 29, 2003

(86) PCT No.: PCT/GB03/04683

§ 371 (c)(1), (2), (4) Date: Mar. 25, 2005

(87) PCT Pub. No.: WO2004/039470

PCT Pub. Date: May 13, 2004

(65) Prior Publication Data

US 2005/0257897 A1    Nov. 24, 2005

(30) Foreign Application Priority Data

Oct. 31, 2002 (GB) .................................. 0225335.9

(51) Int. Cl.
*B01D 1/00* (2006.01)
*B01D 3/42* (2006.01)
*B01D 3/08* (2006.01)

(52) U.S. Cl. .................... 159/6.1; 159/44; 159/DIG. 6; 202/160; 202/238

(58) Field of Classification Search ............... 159/6.1, 159/44, DIG. 6; 202/160, 238; 203/2; 356/923; 374/100, 121
See application file for complete search history.

(56) References Cited

U.S. PATENT DOCUMENTS 5,084,133 A  *  1/1992  Guy et al. .................. 159/47.1

(Continued)

FOREIGN PATENT DOCUMENTS

EP    0345882 A1    12/1989

(Continued)

OTHER PUBLICATIONS

European Patent Office, International Search Report, International Application No. PCT/GB03/04683, Mailed Sep. 1, 2004 (5 pages).

*Primary Examiner*—Virginia Manoharan
(74) *Attorney, Agent, or Firm*—Wood, Herron & Evans, LLP

(57) ABSTRACT

A centrifugal evaporator includes a chamber in which sample containers are carried and rotated by a rotor and are pivotally mounted so as to swing up to a substantially horizontal orientation as the rotor rotates. The evaporator includes an infrared source to direct infra-red radiation towards the rotor and the sample containers carried thereon, to heat at least the latter and any sample material therein. A non-contact temperature sensing infra-red pyrometer having a sensor with a defined field of view is mounted in the chamber, such that while the rotor as such is substantially out of its field of view, each sample container at least partly occupies the pyrometer field of view for a part of each rotation of the rotor. The positions of the infra-red source and the pyrometer components are selected so that the radiation from the infra-red source does not impinge on the pyrometer sensor.

13 Claims, 5 Drawing Sheets

U.S. PATENT DOCUMENTS

| | | | |
|---|---|---|---|
| 5,114,533 A * | 5/1992 | Guy et al. ............... | 159/6.1 |
| 6,364,524 B1 * | 4/2002 | Markham ............... | 374/131 |
| 2008/0210384 A1 * | 9/2008 | Guthrie ............... | 159/6.1 |

FOREIGN PATENT DOCUMENTS

| | | |
|---|---|---|
| GB | 2334688 A | 9/1999 |
| JP | 3221823 A | 9/1991 |
| JP | 5138075 A | 6/1993 |
| JP | 5146720 A | 6/1993 |
| JP | 5212314 A | 8/1993 |
| WO | 0166212 A1 | 9/2001 |

* cited by examiner

TEMPERATURE SENSING IN CENTRIFUGAL EVAPORATORS

FIELD OF INVENTION

This invention concerns centrifugal evaporators and in particular methods and apparatus by which the temperature within an evaporation chamber can be sensed.

BACKGROUND TO THE INVENTION

When drying pharmaceutical compounds by evaporation, such as centrifugal evaporators, it can be important that the material being evaporated is not subjected to temperatures that could damage one or more of the sample components making up the mixture. However, in order to achieve rapid evaporation heat has to be supplied to the sample material during evaporation to balance the heat lost due to the evaporation (the latent heat) of the solvent. In order to achieve these two, possibly conflicting, requirements, it is necessary to accurately monitor the temperature of the sample material, for example to ensure that certain maximum temperatures are not exceeded.

UK Patent Specification 2334688 describes the use of temperature sensing probes placed in or adjacent to samples in a chamber with means for transferring the temperature data from a sensor on the rotor to a system controller remote from the rotor typically external of the chamber. UK Patent Application 0105345.3 describes the use of a non-contact temperature sensing device to sense the temperature of a disc rotor, in which sample containers are fixed in position.

Problems arise when employing a non-contact sensing device in a chamber in which the sample containers move (typically swing upwardly and outwardly) as a rotor gathers speed to generate centrifugal forces on the sample material in the containers.

In general, non-contact temperature sensing devices have a wide field of view. Even so, a single temperature sensing device will only 'see' the swing during part of each rotation of the rotor. Heat transfer between rotor and swing is usually poor, so that if for example heat is supplied by an infra-red (IR) lamp, when the IR lamp is on, the rotor win tend to become heated to a significantly higher temperature than the or each swing, and the sample material in containers such as test tubes therein. Therefore if the sensor is also responsive to the rotor temperature (as is usually the case), this will cause the temperature information from the sensor to suggest a higher sample temperature than will actually exist in the sample material.

Non-contact temperature sensing devices often employ a viewing window (lens), which tends to be susceptible to contamination during evaporation, thus interfering with the temperature monitoring function.

It is an object of the present invention to provide an improved system for non-contact temperature measurement and for viewing the evaporation process in a centrifugal evaporator.

SUMMARY OF THE INVENTION

According to one aspect of the present invention a centrifugal evaporator comprises a chamber in which sample containers are carried by a rotor and are pivotally mounted to the rotor so as to swing up and adopt a generally horizontal attitude as the rotor rotates and a source of infra red radiation also mounted in the chamber so as in use to direct infra red radiation towards the rotor and the sample containers carried thereon, to heat at least the latter and any sample material therein for the purpose of evaporating liquid in the sample material, further comprising a non-contact temperature sensing infra red pyrometer having a sensor with a defined field of view which is mounted in the chamber such that while the rotor as such is substantially out of its field of view, each sample container at least partly occupies the pyrometer field of view for a part of each rotation of the rotor, and the positions of the infrared source and the pyrometer components are selected so that the radiation from the infra red source does not impinge on the pyrometer sensor.

Preferably the infra red source is selected and/or positioned so that in use its radiation predominantly impinges on the sample containers rather than on the rotor as such.

Preferably the position of the pyrometer sensor within the chamber is chosen so that the rotor does not protrude into the pyrometer field of view.

Typically the sensor field of view is generally circular and the size of the sensor is such that it can be considered to be a point source/detector, and the diameter of the circular field of view increases with distance from the source to define a cone whose apex is at the centre of the sensor.

Preferably the diameter of the cone at any point along its axis is equal to or less than $\frac{1}{10}^{th}$ the distance from the point source to the said point, measured along the axis of the cone.

In one embodiment the rotor axis is vertical and a vertical plane passing along the centre of the field of view is arranged to make an acute angle to another vertical plane drawn in a radial direction between the sensor and the axis of rotation of the rotor. Put another way if the rotor axis is vertical, a vertical plane containing the rotor axis and the central point of the sensor preferably makes an acute angle to a vertical plane containing the central point of the sensor and the central axis of the field of view of the sensor.

Typically the acute angle is chosen to maximise the period of time for which each sample container is within the field of view of the sensor. Typically the acute angle lies in the range 10 to 80 degrees.

Preferably the direction of rotation of the rotor in the chamber is chosen so that any debris thrown from the rotor during evaporation will tend to be directed away from the sensor, so as generally not to impact on the sensor.

Preferably temperature sensing means is provided for measuring the temperature of the chamber close to an area of the interior of the chamber wall which is within the field of view of the IR pyrometer sensor, and preferably the temperature sensing means is positioned in or on the wall of the chamber.

The evaporator preferably further comprises electrical signal processing means receptive of signals from the sensor and the chamber temperature sensing means, which is adapted to adjust the temperature values from the sensor to take account of the chamber temperature, and preferably further temperature sensing means is positioned so as to sense the temperature of the pyrometer sensor body and/or the temperature of the body of the chamber temperature sensing means, to provide further data to allow sensor temperature compensation to be applied to the temperature data from the pyrometer sensor and/or the chamber temperature sensing means.

The invention thus allows a non-contact sensing temperature device to be employed in a centrifugal evaporator where sample containers are carried by a rotor and are mounted so as to swing-up as the rotor speed increases, and according to another aspect of the invention, the temperature sensing device comprises an infra-red pyrometer having a narrow field of view which is mounted in the evaporating chamber such that the swing at least partly occupies the pyrometer field of view during part of each rotation of the rotor, while the rotor itself does not (or substantially does not) enter the pyrometer field of view during rotor rotation.

Where the temperature of the chamber is measured at a location at or close to an area of the chamber wall which lies in the filed of view of the IR pyrometer, data relating to the wall temperature can be used in a simple equation to correct the raw temperature data from the pyrometer.

Since IR pyrometers are affected by changes in their ambient conditions the temperature of the body of the IR pyrometer sensor and/or the body of the temperature sensor detecting the chamber wall temperature is preferably measured to provide data to allow further temperature compensation corrections to be applied to the raw temperature data from the pyrometer and/or sensor.

Figure 1:
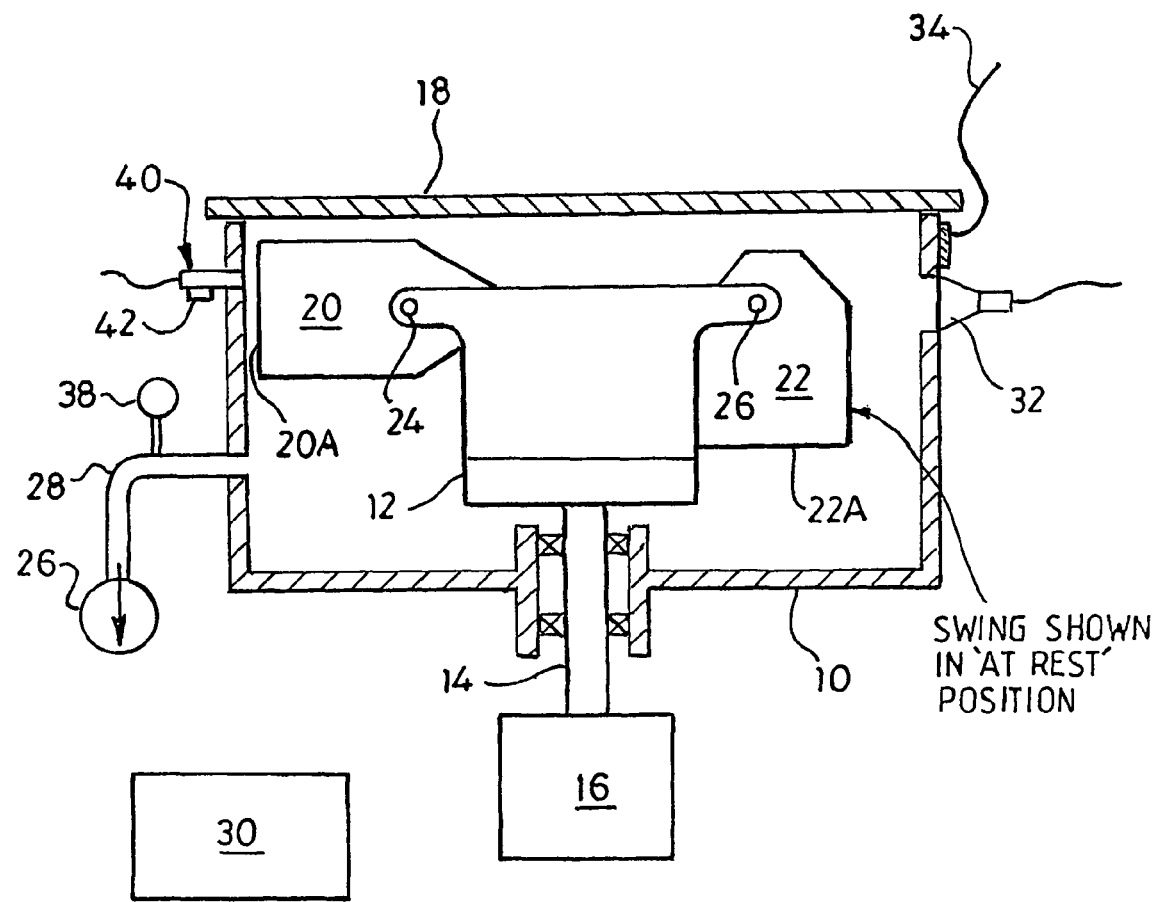
FIG. 1 illustrates a swing type rotor as incorporated in a centrifugal evaporator chamber.

In FIG. 1 an evaporation chamber 10 contains a rotor assembly 12 carried in a central shaft 14 driven by an electrically powered drive 16 typically an electric motor and if required a gearbox.

The chamber 10 can be sealed by a lid 18 after sample containers such as 20, 22 have been pivotally mounted on the rotor using pivots 24, 26. The chamber can be evacuated by operating a vacuum pump 26 connected to the chamber by a pipe 28. The system is controlled by a computer based control centre 30.

In use the containers swing upwardly on their pivots 24, 26 from the points shown by container 22 to that of container 20.

An infrared source 32 directs IR radiation towards the trajectory of the rotating sample containers 20, 22 so that as they are rotated around with the containers by the rotation of the rotor, the undersides 20A, 22A of the containers are presented in turn to the IR radiation emitted from the source 32, and the containers and their contents are warmed.

This will lead to any liquid in the sample contents in each container also to become warm and if raised above a critical temperature, to begin to evaporate.

Vapour so created will be drawn out of the chamber by the pump 26 in known manner and can be separated in know manner from the air passing to the pump.

The IR source forms one component of a radiation pyrometer the other component of which is a sensor 34 which is located in the chamber 10 so that the radiation emitted by 32 does not directly enter the field of view of the sensor 34. Instead the sensor is directed towards the trajectory of the rotating containers, and in particular the undersides of the containers so that it will sense the temperature of the containers. Where the base of the containers is made from a material having good thermal conductivity, the sensed temperature will therefore be proportional to the temperature of the sample material in the containers.

If the speed of rations is constant and the radiation from 32 has a constant intensity, and all the containers are thermally similar, all the containers and their contents will be heated by 32 to substantially the same temperature, so that the "mean" temperature detected by 34 will approximate to the temperature of each of the samples.

The control centre 36 controls power to 32, 16 and 26 and receives temperature signals from 34 so that evaporative drying of the samples can be controlled. A pressure sensor 38 also provides vacuum information to 30.

A temperature sensing device 40 is mounted so as to sense the temperature of the inside wall of the chamber in the area thereof to which the sensor 34 is directed.

A further temperature sensing device 42 is attached to the device 40 to sense the temperature of the body of the device 40. Although not shown a similar temperature sensing device may be attached to measure the temperature of the body of sensor 34.

Signals indicating the temperature sensed by each of the temperature sensing devices 40, 42 etc, are supplied to 30.

Figure 2:
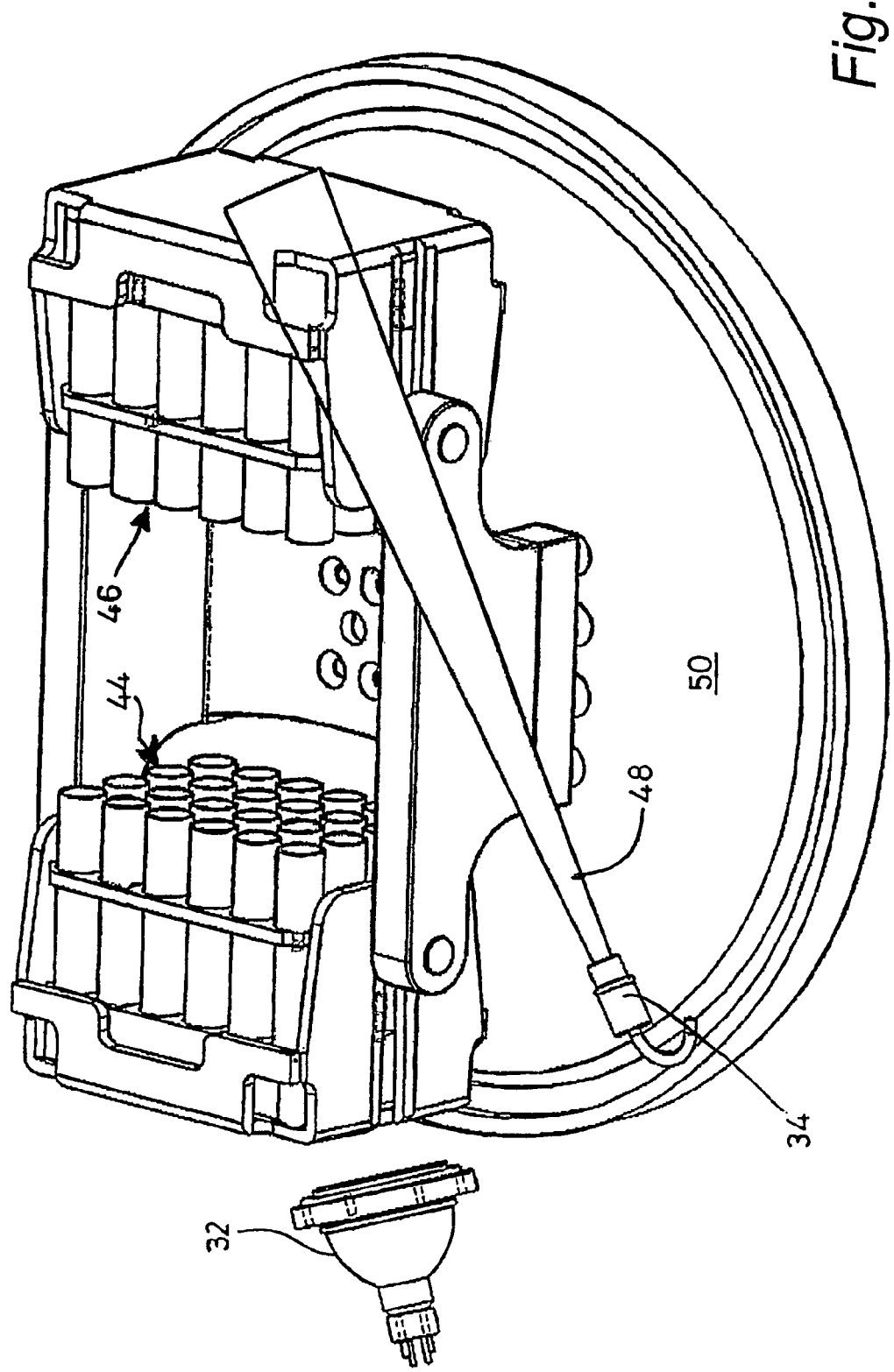
FIG. 2 illustrates a preferred arrangement embodying the invention, incorporating an infra-red pyrometer detector.

FIG. 2 is a perspective view of the rotor assembly with the sample containers shown as comprising arrays of test tubes 44, 46. The IR source 32 and sensor 34 and the narrow conical field of view 48 of the latter are also shown together with the base 50 of the chamber 20.

Figure 3:
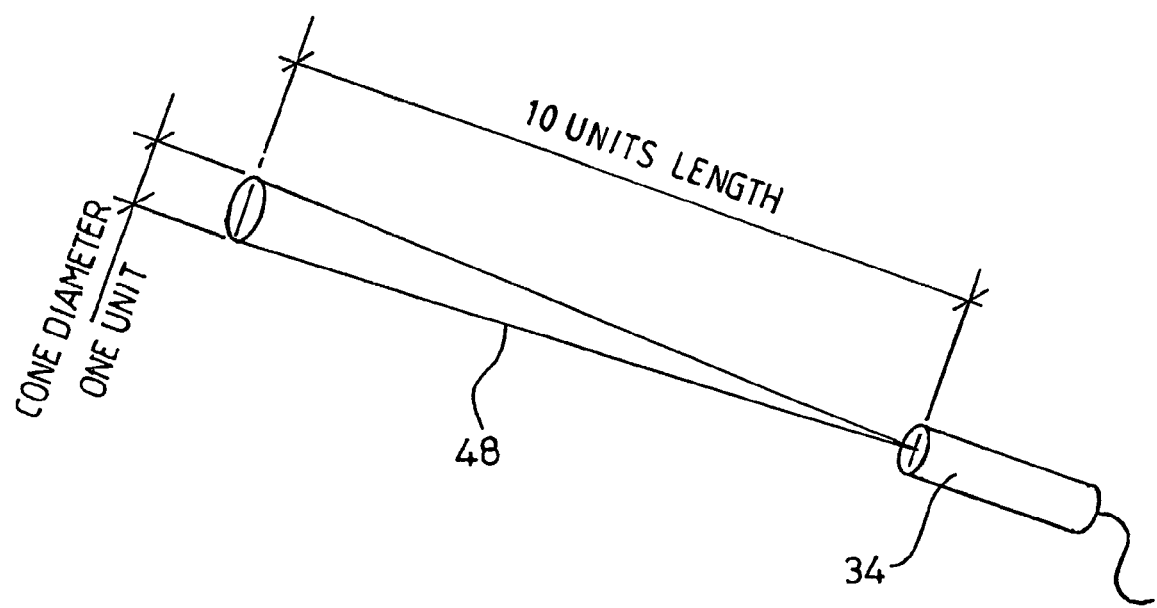
FIG. 3 illustrates a preferred field of view for the Infra-red pyrometer of FIG. 2.

FIG. 3 shows detail of a preferred conical field of view for 34, in which the diameter of the conical cone cross section increases at the rate of 1 unit for every 10 units of distance from the centre of the sensor 34.

Figure 4:
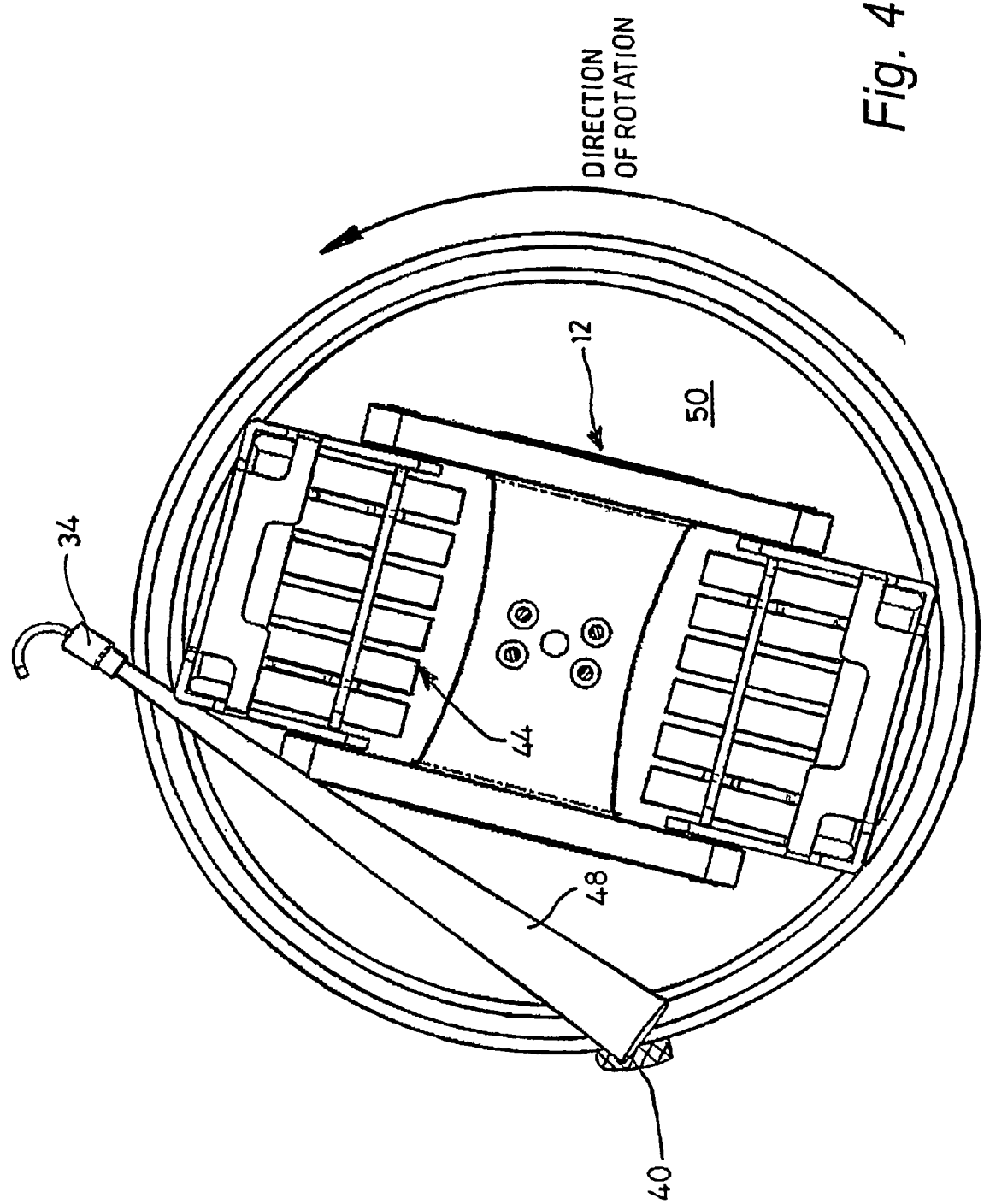
FIG. 4 shows the swing just entering the field of view.
Figure 5:
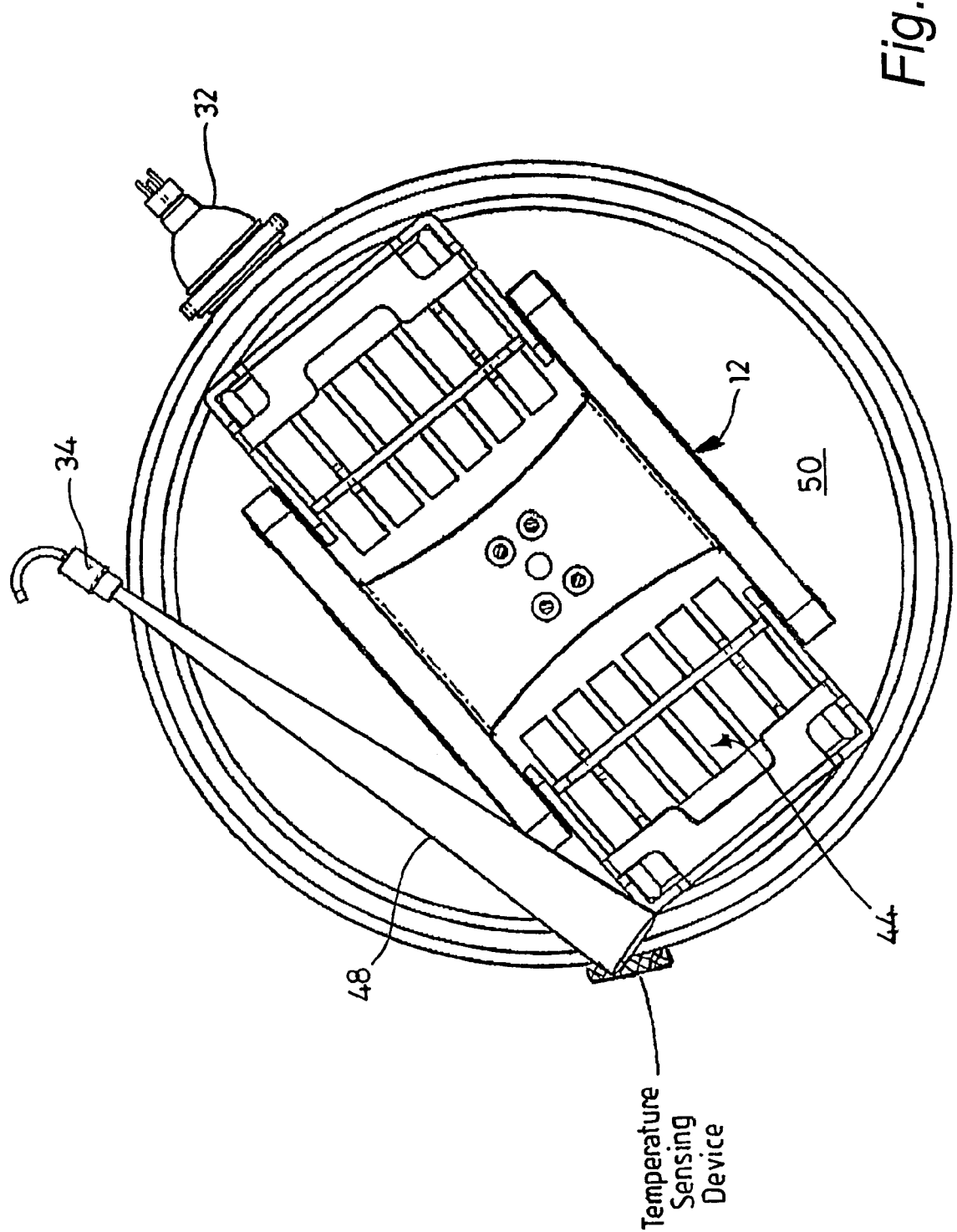
FIG. 5 shows the swing just exiting from the field of view of the pyrometer.

FIG. 4 shows sample containers 44 just entering and FIG. 5 shows them just leaving the field of view 48 of the sensor 34.

Both of FIGS. 4 and 5 also show the position of the chamber temperature sensor 40.

The invention claimed is:

1. A centrifugal evaporator comprising:
   a chamber in which sample containers are carried by a rotor, wherein the rotor is rotatable about a rotor axis and the sample containers are pivotally mounted to the rotor so as to swing up to a substantially horizontal orientation as the rotor rotates;
   a source of infra-red radiation mounted in the chamber so as in use to direct infra-red radiation towards the rotor and the sample containers carried thereon, to heat at least the latter and any sample material therein for the purpose of evaporating liquid in the sample material; and
   a non-contact temperature sensing infra-red pyrometer having a sensor with a defined field of view which is mounted in the chamber, such that while the rotor is substantially out of its field of view, each sample container at least partly occupies the pyrometer field of view for a part of each rotation of the rotor, and the positions of the infra-red source and the pyrometer sensor are selected so that the radiation from the infra-red source does not impinge on the pyrometer sensor.

2. A centrifugal evaporator as claimed in claim 1 wherein the infra-red source is selected and/or positioned so that in use its radiation predominantly impinges on the sample containers rather than the rotor.

3. A centrifugal evaporator as claimed in claim 1 wherein the position of the pyrometer sensor within the chamber is chosen so that the rotor does not protrude into the sensor field of view.

4. A centrifugal evaporator as claimed in claim 1 wherein the sensor field of view is generally circular, and the diameter of the circular field of view increases with distance from the source to define a cone whose apex is at the center of the sensor.

5. A centrifugal evaporator as claimed in claim 4 wherein the diameter of the cone at any point along its axis is less than or equal to $1/10^{th}$ the distance from the point source to said point, measured along the axis of the cone.

6. A centrifugal evaporator as claimed in claim 1 wherein the rotor axis is vertical and a vertical plane containing the rotor axis and a central point of the sensor makes an acute angle to a vertical plane containing the central point of the sensor and a central axis of the field of view of the sensor.

7. A centrifugal evaporator as claimed in claim 6 wherein the acute angle is chosen to maximise the period of time for which each sample container is within the field of view of the sensor.

8. A centrifugal evaporator as claimed in claim 7 wherein the acute angle is in the range 10 to 80 degrees.

9. A centrifugal evaporator as claimed in claim 1 wherein the direction of rotation of the rotor in the chamber is chosen so that any debris thrown from the rotor during evaporation will tend to be directed away from the sensor, so as generally not to impact thereon.

10. A centrifugal evaporator as claimed in claim 1 comprising a temperature sensing arrangement to measure the temperature of the chamber close to an area of the interior of the chamber wall which is within the field of view of the sensor.

11. A centrifugal evaporator as claimed in claim 10 wherein the chamber temperature sensing arrangement is positioned in the chamber.

12. A centrifugal evaporator as claimed in claim 11 further comprising electrical signal processing circuitry receptive of signals from the infra-red pyrometer sensor and the temperature sensing arrangement which is adapted to adjust the temperature values from the infra-red pyrometer sensor to take account of the chamber temperature.

13. A centrifugal evaporator as claimed in claim 12 wherein a further temperature sensing arrangement is positioned so as to sense the temperature of a body of the pyrometer sensor and/or of a body of the chamber, and temperature corrections are applied to the temperature data from the infra-red pyrometer sensor and/or the temperature sensing arrangement with reference to signals from the further temperature sensing arrangement.

* * * * *

UNITED STATES PATENT AND TRADEMARK OFFICE
CERTIFICATE OF CORRECTION

PATENT NO. : 7,503,997 B2  Page 1 of 1
APPLICATION NO. : 10/522448
DATED : March 17, 2009
INVENTOR(S) : Lee-Smith et al.

It is certified that error appears in the above-identified patent and that said Letters Patent is hereby corrected as shown below:

In column 1, line 42, change "the rotor win tend to" to --the rotor will tend to--, as appears in the Specification of the national filing of International Application No. PCT/GB2003/004683, at Page 2, line 4.

In column 1, line 44, change "significantly higher temperature than the or each swing," to --significantly higher temperature than each swing,--.

In column 3, line 47, change "can be separated in know manner" to --can be separated in known manner--.

In column 3, line 60, change "If the speed of rations is constant" to --If the speed of rotation is constant--.

In column 4, line 12, change "temperature sensing devices 40, 42 etc," to --temperature sensing devices 40, 42 etc.--.

In claim 1, column 4, line 42, change "at least partly occupies the pyrometer field of view" to --at least partly occupies the field of view--, as appears in the Amendment dated September 3, 2008 at Page 2, line 16.

In claim 6, column 4, line 67, change "and a central point of the sensor makes" to --and a central point of the sensor make--.

Signed and Sealed this

Twenty-third Day of February, 2010

David J. Kappos
*Director of the United States Patent and Trademark Office*